United States Patent [19]

Nieves et al.

[11] Patent Number: 4,949,376
[45] Date of Patent: Aug. 14, 1990

[54] TELEPHONE NETWORK INTERFACE APPARATUS

[75] Inventors: Anthony L. Nieves, Bradley Beach; Thomas J. Collins, Wall, both of N.J.

[73] Assignee: Keptel, Inc., Tinton Falls, N.J.

[21] Appl. No.: 366,498

[22] Filed: Jun. 15, 1989

[51] Int. Cl.$^5$ ............................................. H04M 9/00
[52] U.S. Cl. ................................... 379/399; 379/412; 379/442
[58] Field of Search ................ 379/399, 412, 43, 441, 379/442; 361/356; 439/535, 521

[56] References Cited

U.S. PATENT DOCUMENTS 4,800,588  1/1989  Poster, Jr. ........................ 379/399 X

*Primary Examiner*—James L. Dwyer
*Attorney, Agent, or Firm*—R. Gale Rhodes, Jr.

[57] ABSTRACT

Telephone network interface apparatus including a base and a wall circumscribing the base and extending outwardly therefrom, the base and wall cooperatively providing an open compartment having a telephone company compartment portion and a subscriber compartment portion; the telephone company compartment portion is for having a plurality of pairs of telephone company terminals mounted therein for connection to a plurality of incoming telephone company lines and the subscriber compartment portion for having a plurality of subscriber terminals mounted therein for connection to a plurality of subscriber premises lines. A telephone company cover is included and is mounted pivotally to a portion of the wall and is for being closed and fastened over the telephone company compartment portion; first fastening means are included for fastening the telephone company cover closed over the telephone company compartment portion. A subscriber cover is also included and is mounted pivotally to the telephone company cover and for being closed and fastened over the subscriber compartment portion; second fastening means are included for fastening the subscriber cover closed over the subscriber compartment portion.

9 Claims, 14 Drawing Sheets 4,949,376

TELEPHONE NETWORK INTERFACE APPARATUS

BACKGROUND OF THE INVENTION

This invention relates to new and improved telephone network interface apparatus for interconnecting a plurality of incoming telephone company lines to a plurality of subscriber premises lines and for providing demarcation points therebetween to facilitate determination of whether faults exist on the incoming telephone company lines or the subscriber premises lines.

More particularly, this invention relates to new and improved telephone network interface apparatus including a telephone cover and a subscriber cover. The telephone company cover is for being closed and fastened over a plurality of incoming telephone company lines and is for denying access to such terminal to other than telephone company personnel. The subscriber cover is for being closed and fastened over a plurality of subscriber terminals for connection to a plurality of subscriber premises lines, a plurality of telephone plugs and jacks providing the demarcation points and is for denying access to the subscriber terminals, telephone plugs and jacks, to other than telephone company personnel and the subscriber. An override feature is provided whereby telephone company personnel may unfasten the telephone company cover and override the fastening of the subscriber cover so as to provide the telephone company personnel with access to both the telephone company terminals, the subscriber terminals, and the telephone plugs and jacks while the subscriber cover remains fastened.

SUMMARY OF THE INVENTION

Telephone network interface apparatus embodying the present invention may include a base and a wall circumscribing the base and extending outwardly therefrom, the base and the wall cooperatively providing an open compartment having a telephone company compartment portion and a subscriber compartment portion; the telephone company compartment portion is for having a plurality of pairs of telephone company terminals mounted therein for connection to a plurality of incoming telephone company lines and the subscriber compartment portion is for having a plurality of subscriber terminals mounted therein for connection to a plurality of subscriber premises lines. A telephone company cover is included and is mounted pivotally to a portion of the wall and is for being closed and fastened over the telephone company compartment portion; first fastening means are included for fastening the telephone company cover closed over the telephone company compartment portion. A subscriber cover is also included and is mounted pivotally to the telephone company cover and is for being closed and fastened over the subscriber compartment portion; second fastening means are included for fastening the subscriber cover closed over the subscriber compartment portion.

DESCRIPTION OF THE PREFERRED EMBODIMENTS

Figure 1:
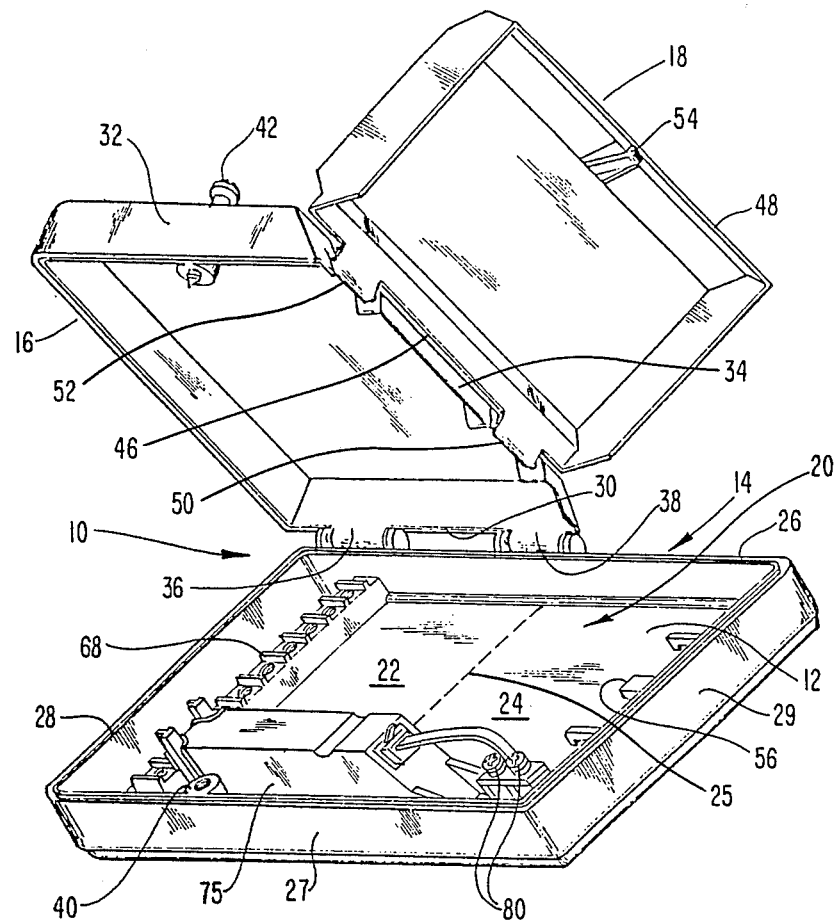
FIG. 1 is a perspective view, generally in front elevation, of a first embodiment of telephone network interface embodying the present invention and showing the telephone company and subscriber covers in the open position.

Referring now to FIGS. 1-10 and in particular to FIG. 1, there is shown in perspective a first embodiment of telephone network interface apparatus embodying the present invention and indicated by general numerical designation 10. Apparatus 10 includes a base 12, a wall indicated by general numerical designation 14 circumscribing the base 12 and extending outwardly therefrom, a telephone company cover 16 and a subscriber cover 18. As may be understood from FIG. 1, base 12 and wall 14 cooperatively provide an open compartment indicated by general numerical designation 20 and including a leftward telephone company compartment portion 22 and a rightward subscriber compartment portion 24, the division between the telephone company compartment portion 22 and the subscriber compartment portion 24 being indicated generally by dashed line 25. Generally it will be understood, and as described in detail below and as shown in detail in FIG. 8, the telephone company compartment portion 22 is for having a plurality of telephone company terminals (e.g. terminals 61 . . . 65, FIG. 8) mounted therein for connection to a plurality of incoming telephone lines (not shown) and the subscriber compartment portion 24 is for having a plurality of subscriber terminals (e.g. terminals 76. . . 80, FIG. 8) mounted therein for connection to a plurality of subscriber premises lines (not shown); one pair of subscriber terminals 80 is shown in FIG. 1 and such terminals are provided on removably mounted individual subscriber line module 75 described in detail below and shown in detail in FIG. 9. Referring still to FIG. 1, it will be noted that the base 12 is generally rectangular and that the wall 14 is continuous and generally rectangular and includes a top wall 26, a bottom wall 27, a left side wall 28, and a right side wall 29.

Figure 2:
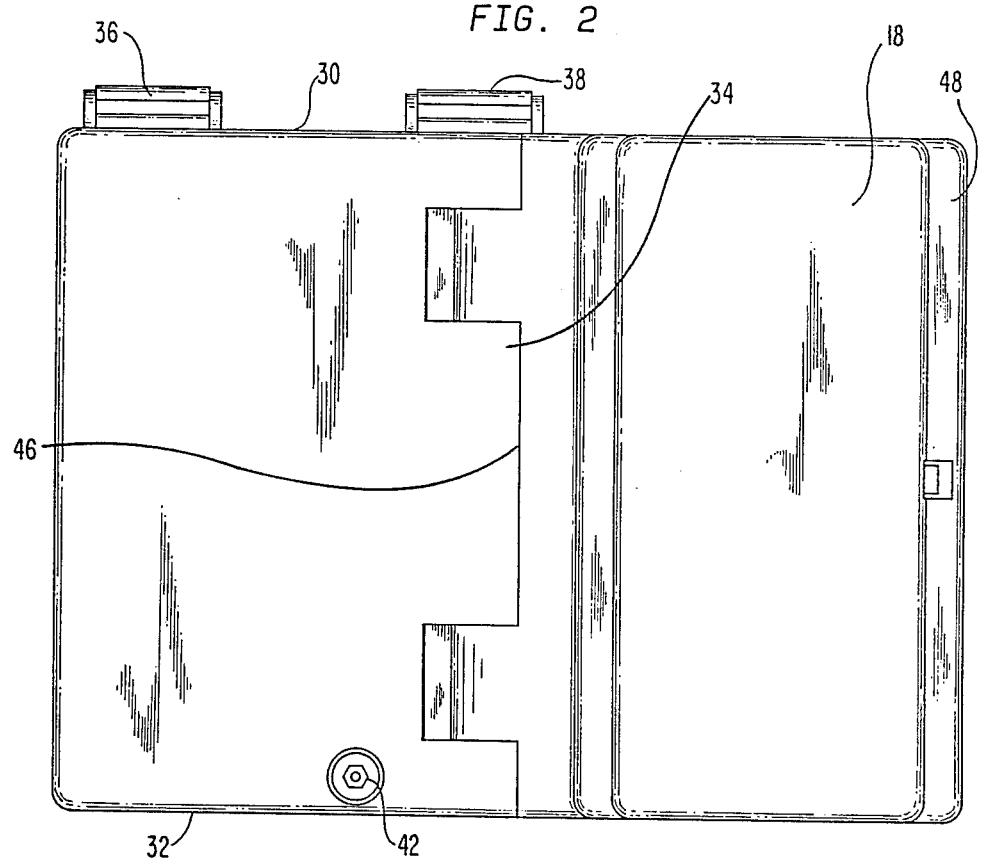
FIGS. 2 through 7 are, respectively, front elevational, bottom, right side, left side, top and rear elevational views of the telephone network interface apparatus of FIG. 1 with the telephone company, and subscriber covers shown in the closed
Figure 3:
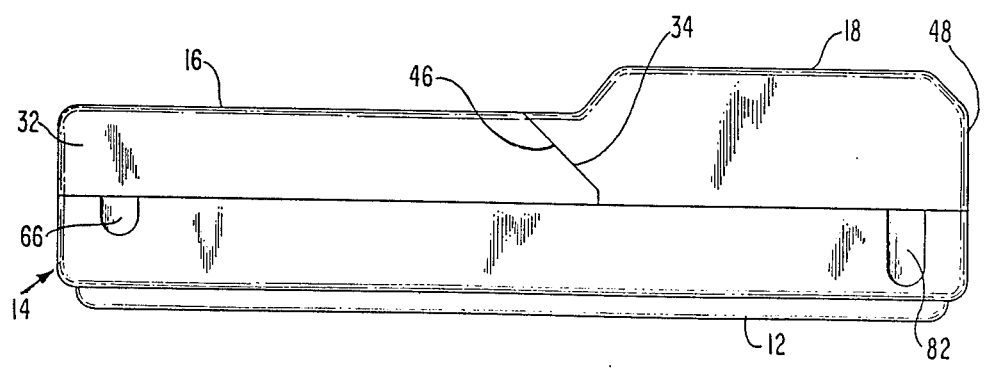
Figure 5:
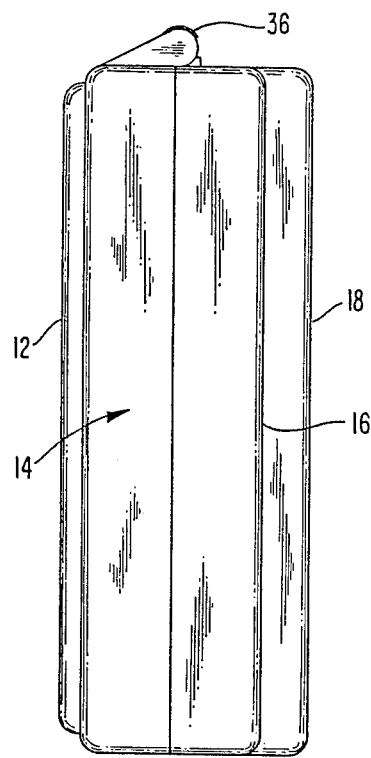
Figure 4:
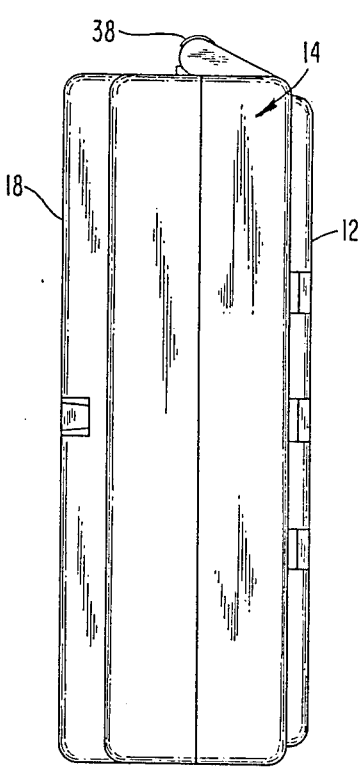
Figure 6:
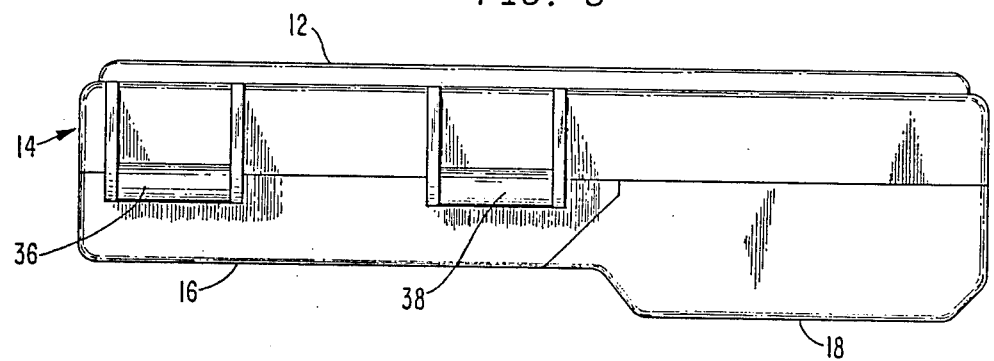
Figure 7:
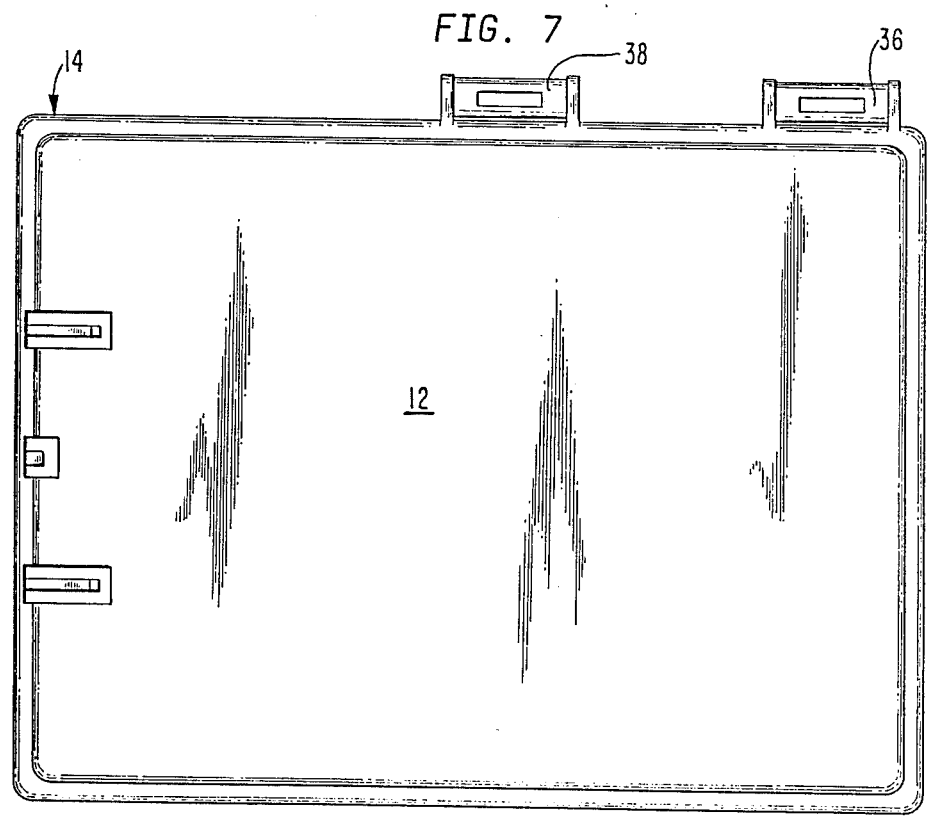
Figure 8:
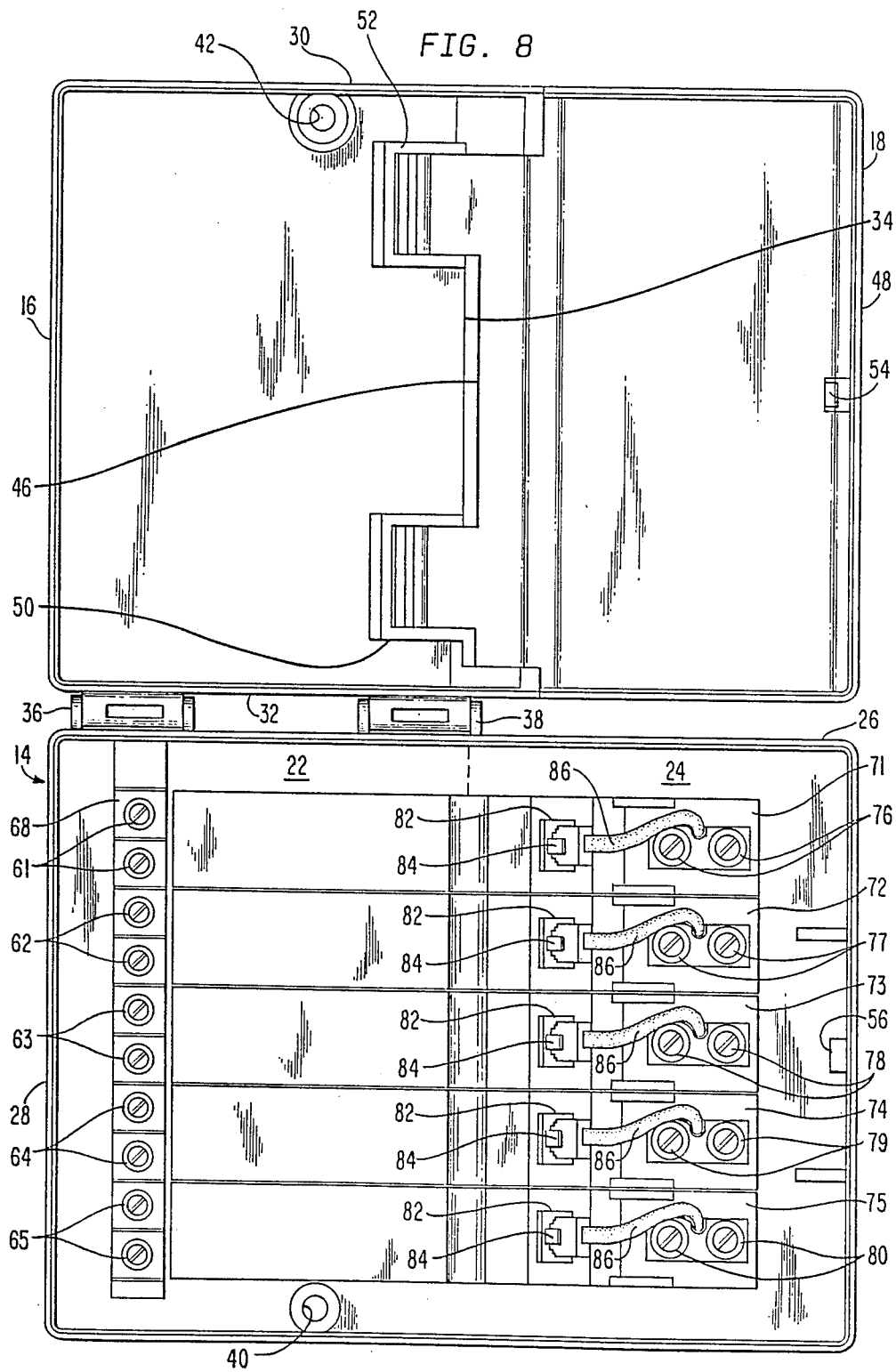
FIG. 8 is a front elevational view of the telephone network interface apparatus of FIG. 1 showing the telephone company and subscriber covers in the fully open positions and showing a plurality of telephone company terminals and a plurality of individual subscriber line modules mounted on the base of the telephone network interface apparatus.

As may be noted, particularly from FIGS. 1, 2 and 8, the telephone company cover 16 is generally rectangular in shape and is generally dimensioned to overlie the telephone company compartment portion 22. The telephone company cover 16 includes a top edge 30, a bottom edge 32, and a right edge 34. The top edge 30 of the telephone company cover 16 is mounted pivotally to the leftward portion of the top wall 26 extending generally above the telephone company compartment portion 22 by hinges 36 and 38 to permit the telephone company cover 16 to be pivoted toward the telephone company compartment portion 22 to close the same and to be pivoted away from the telephone company compartment portion 22 to open the same.

The bottom wall 27 includes a leftward portion extending generally below the telephone company compartment portion 22 and is provided with a threaded bore or hole 40 for threadedly receiving a screw 42 mounted rotatably adjacent the bottom edge 32 of the telephone company cover 16; the screw 42 and bore 40 provide cooperative threaded fastening means. Upon the telephone company cover 16 being pivoted closed over the telephone company compartment portion 22 to cover the same, the screw 42 is for being threaded into the bore 40 to fasten the telephone company cover closed over the telephone company compartment portion and to the leftward portion of the bottom wall 27. The head of the screw 42 is of a type not generally available to the public and is for being fastened and unfastened by a tool also not generally available to the public but which too may be carried by telephone company personnel to fasten and unfasten the screw. Use of the special screw 42 and the special tool generally denies access to the telephone company compartment 22, and to telephone company terminals mounted therein, to others than telephone company personnel.

The subscriber cover 18, FIGS. 1, 2, and 8, is generally of rectangular shape and is generally dimensioned to overlie the subscriber compartment portion 24. The subscriber cover 18 includes a left edge 46 and a right edge 48. The left edge 46 of the subscriber cover 18 is mounted pivotally to the right edge 34 of the telephone company cover 16 by hinges 50 and 52 to permit the subscriber cover 1, upon the telephone company cover 16 being fastened closed over the telephone compartment portion 22, to be pivoted toward the subscriber compartment portion 24 to close the same and to be pivoted away from the subscriber compartment portion to open the same. The interior of the right edge 48 of the subscriber cover 18, best seen in FIG. 1, is provided with a flexible snap latch member 54 for being snapped over a detent 56 provided on the interior of the right wall 29 to snap-fasten the subscriber cover 18 closed over the subscriber compartment portion 24; the flexible snap latch member 54 and the detent 56 provide cooperative snap fastening means. The snap latch member 54 and detent 56 permit the subscriber to open the subscriber compartment portion while the telephone company cover 16 is fastened over the telephone company compartment portion 22 by unsnapping the flexible snap latch member 54 from the detent 56, and permit telephone company personnel to open both the telephone company compartment portion 22 and the subscriber compartment portion 24 by threadedly unfastening the screw 42 from the threaded bore 40 and by unsnapping the flexible snap latch member 54 from the detent 56 and thereafter by pivoting the telephone company cover away from the telephone company compartment portion 22 which in turn pivots the subscriber cover 18 away from the subscriber compartment portion 24 because the subscriber cover 18 is mounted pivotally to the telephone company cover 16.

Referring now particularly to FIGS. 1 and 8, the telephone company compartment portion 22 is for having a plurality of pairs of telephone company terminals 61 . . . 65 mounted therein for connection to a plurality of incoming telephone company lines (not shown) which incoming telephone lines are admitted to the telephone company compartment portion 22 by opening 66 (FIG. 3) formed in the leftward portion of the bottom wall 27. The pairs of telephone company terminals 61 . . . 65 may be of the screw type terminals and may be mounted in the telephone company compartment portion 22 by being mounted on a telephone company terminal block 68 suitably secured to the base 12 such as by a suitable adhesive.

A plurality of removable individual subscriber line modules 71 . . . 75 (FIG. 8) are mounted removably on the base 12 and provide a plurality of pairs of subscriber terminals 76 . . . 80 for connection to a plurality of subscriber premises lines (not shown) which subscriber premises lines are admitted into the subscriber compartment portion 24 by an opening 82 (FIG. 3) formed in the rightward portion of the bottom wall 27.

Figure 9:
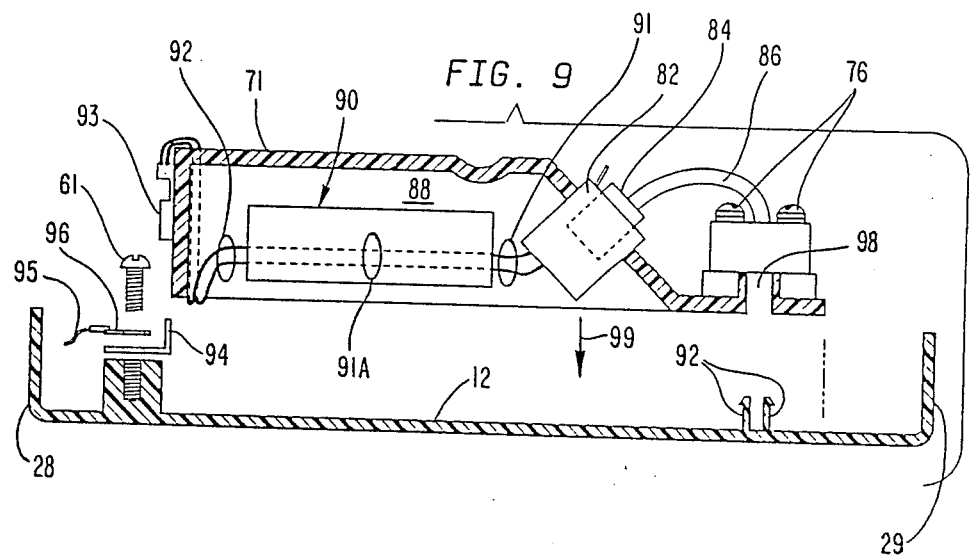
FIG. 9 is an exploded, generally cross-sectional view of an individual subscriber line module shown in FIG. 8.
Figure 10:
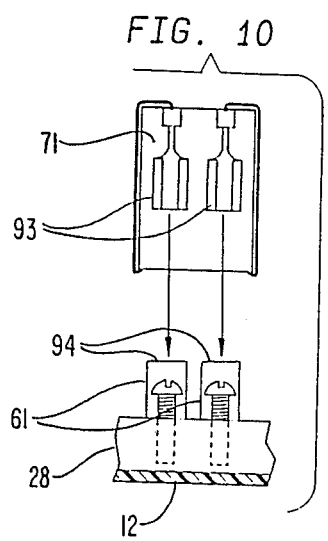
FIG. 10 is an exploded view showing the rear of an individual subscriber line module and a partial view of the telephone company terminals and illustrating diagrammatically the electrical interconnection between the individual subscriber line module and a pair of telephone company terminals.

As may be understood by reference to FIG. 8, each removable individual subscriber line module includes or is provided with a telephone jack 82, an associated telephone plug 84 electrically interconnected with the associated pair of subscriber terminals by a dual conductor cable 86 (also note FIG. 9). The electrical interconnection of the telephone jack 82 with an associated pair of telephone company terminals may be understood by reference to FIGS. 9 and 10 and with regard to representative individual subscriber line module 71. Individual subscriber line module 71 is provided with an internal space 88 for receiving or housing a telephone circuit such as, for example, a Maintenance Termination Unit, Half-Ringer, or the like, and which telephone circuit is indicated by general numerical designation 90. As shown in FIG. 9, one end of the telephone circuit 90 is electrically connected to the telephone jack 82 by electrical conductors 91 and the other end of the telephone circuit 90 is electrically connected by electrical conductors 92 to a pair of electrically conductive terminals 93 mounted on the rear of the module 71 as may be best seen in FIG. 10; in the event the telephone circuit 90 is not included the telephone jack 82 is connected directly to the terminals 93 by electrical conductors 91A shown by dashed lines in FIG. 9. Each pair of telephone company terminals, e.g. representative pair of telephone company terminals 61 shown in FIG. 10, are provided with a pair of upwardly extending electrically conductive terminal members 94 for being wedgedly received within the terminals 93 upon the terminals 93 being forced downwardly thereover in the act of removably mounting the module 71 to the base 12 (as indicated by the downwardly extending arrows in FIG. 10) to place the terminal members 94 in mechanical and electrical engagement with the terminals 93. It will be understood that the telephone jack 82 and telephone plug 84 (FIG. 9) are provided with respective electrical conductors (not shown) in the manner known to those skilled in the art for providing, in part, electrical interconnections between the pair of subscriber terminals 76 and a subscriber premises line (not shown) connected thereto and the pair of telephone company terminals 61 and an incoming telephone line (not shown) connected thereto. One conductor of a pair of conductors of an incoming telephone line is shown in the lower lefthand portion of FIG. 9 and indicated by numerical designation 95; the incoming telephone conductor 95 is electrically connected to the telephone company terminal 61 by the terminal 96.

Representative removable individual subscriber line module 71, FIG. 9, is mounted removably to the base 12 by a pair of opposed, flexible members 97 extending upwardly from the interior of the base 12 and provided with upper wedge-shaped portions as shown; the members 97 are for being wedged together and inserted into the hole 98 formed in the module 71 upon the module being forced downwardly thereover as indicated by the arrows 99, the members 97 then expand with the wedge-shaped upper portion extending upwardly above the hole 98 thereby mounting the module to the base 12. The wedging of the terminals 94 into the terminals 93 as indicated in FIG. 10 and described above also assists in mounting the module to the base.

Thus, FIG. 9, it will be understood that upon an incoming telephone line (not shown) being connected to the pair of telephone terminals 61 and upon the subscriber premises line (not shown) being connected to the pair of subscriber terminals 76, and upon the plug 84 being plugged into the jack 82, the subscriber premises line is connected electrically to the incoming telephone line. Upon the telephone plug 84 being unplugged from the telephone jack 82 and upon the plug of an operating telephone being plugged into the telephone jack 82, determination of whether a fault exists on the incoming telephone line or the subscriber premises line is facilitated.

Figure 11:
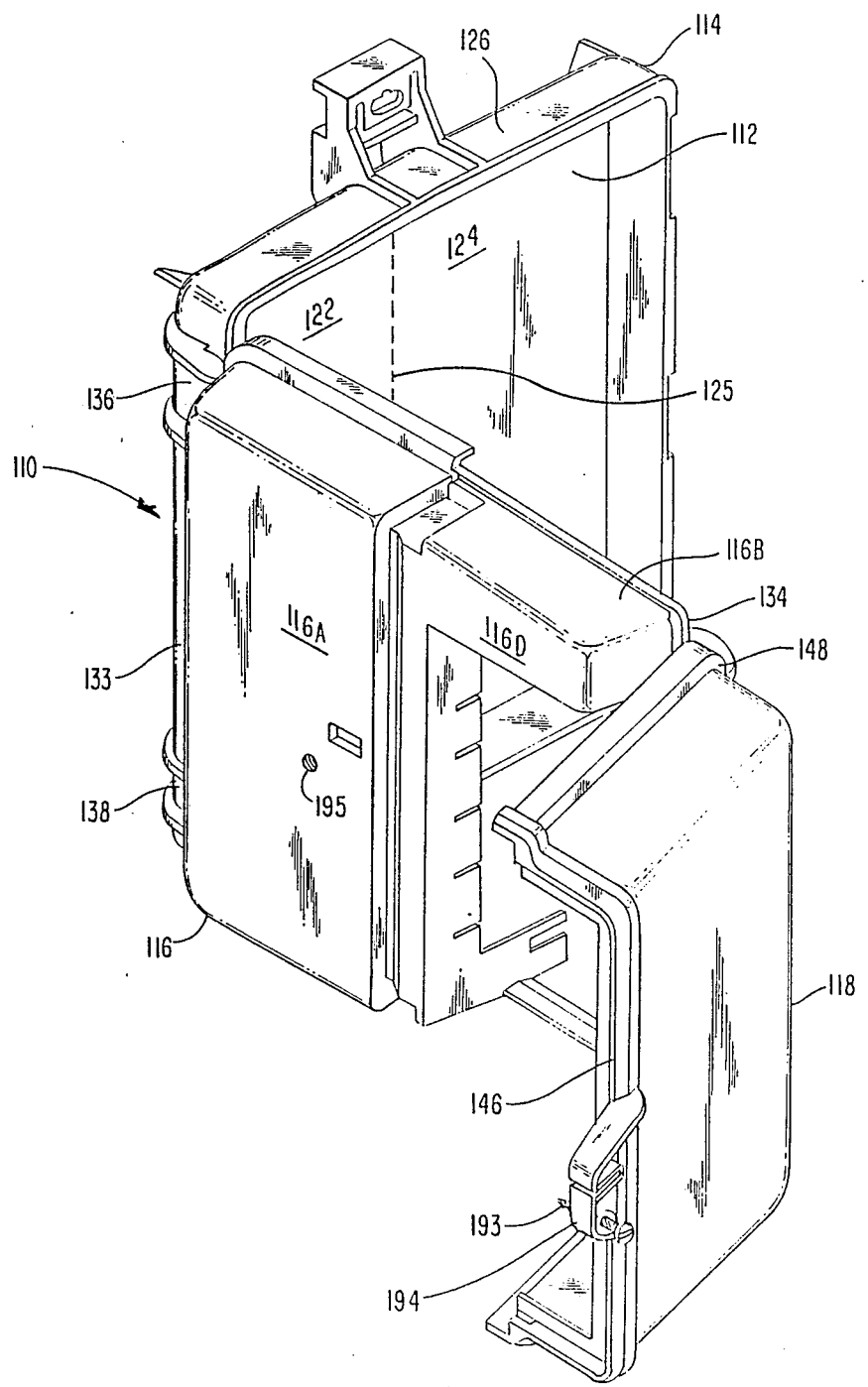
FIG. 11 is a perspective view, generally in front elevation, of an alternate embodiment of telephone network interface apparatus embodying the present invention and showing the telephone company and subscriber covers in their open positions and showing the base without the telephone company terminals and the individual subscriber lines modules mounted therein.
Figure 12:
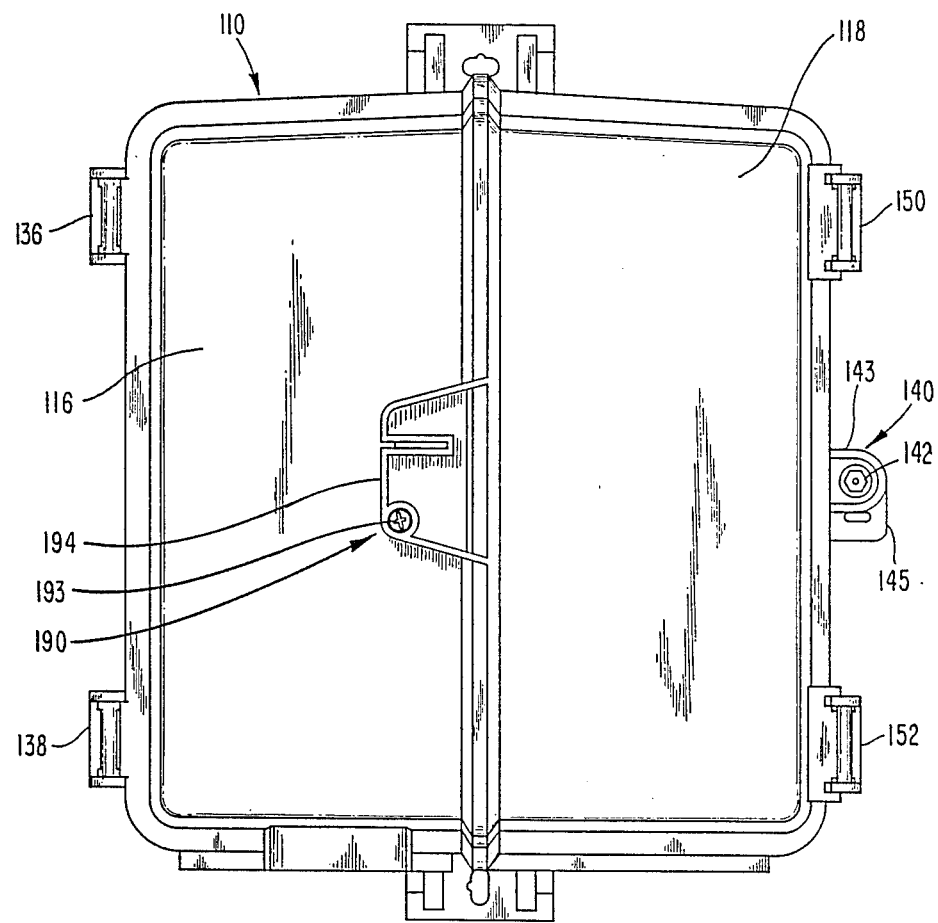
FIGS. 12 through 17 are, respectively, front elevational, bottom, right side, left side, top and rear elevational views of the telephone network interface apparatus of FIG. 11 but with the telephone company and subscriber covers being shown in the closed positions.
Figure 18:
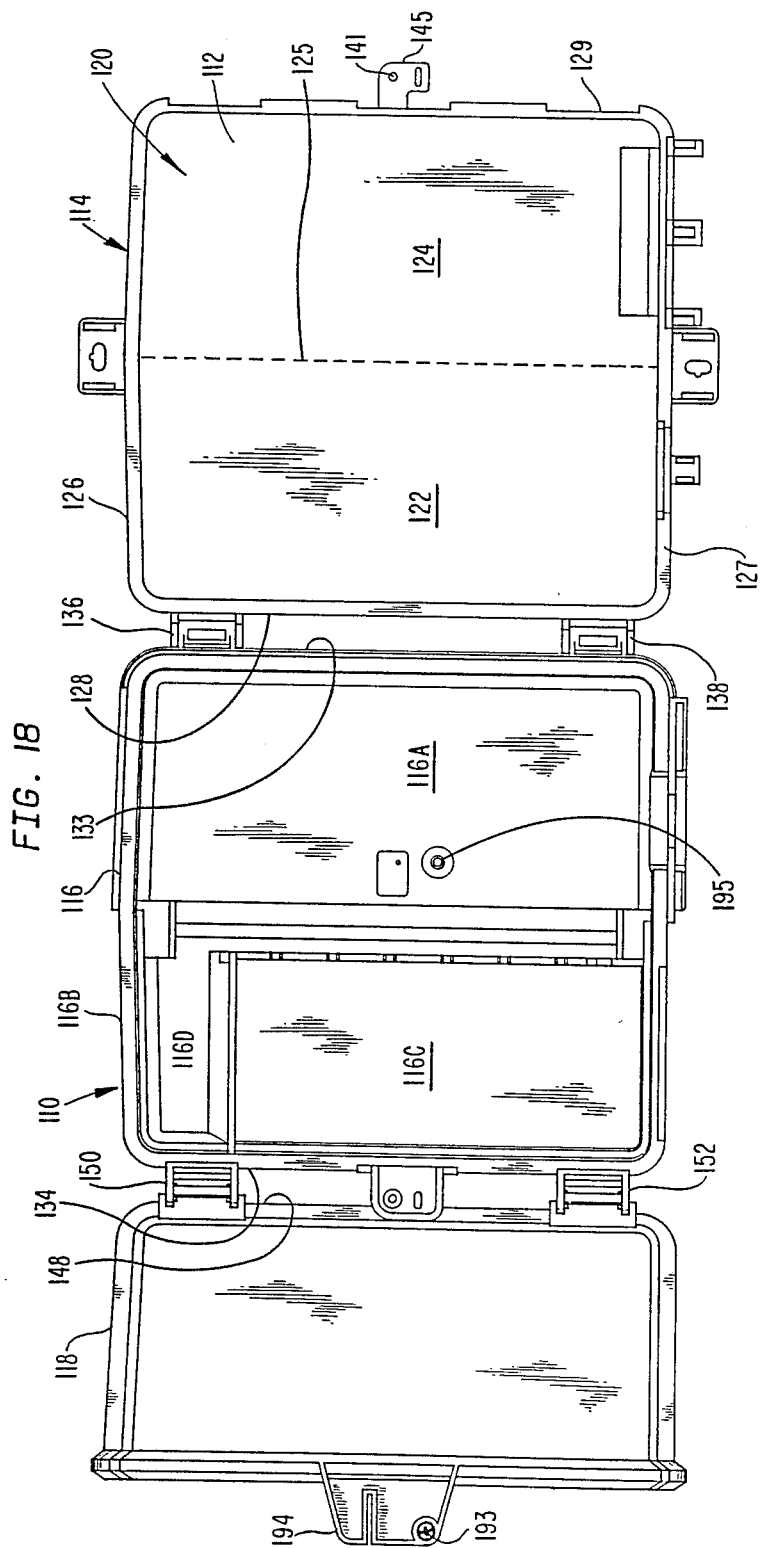
FIG. 18 is a front elevational view of the telephone network interface apparatus of FIG. 11 showing the telephone company and subscriber covers in the fully opened positions but not showing any telephone company terminals or individual subscriber line modules mounted to the base of the apparatus.
Figure 18A:
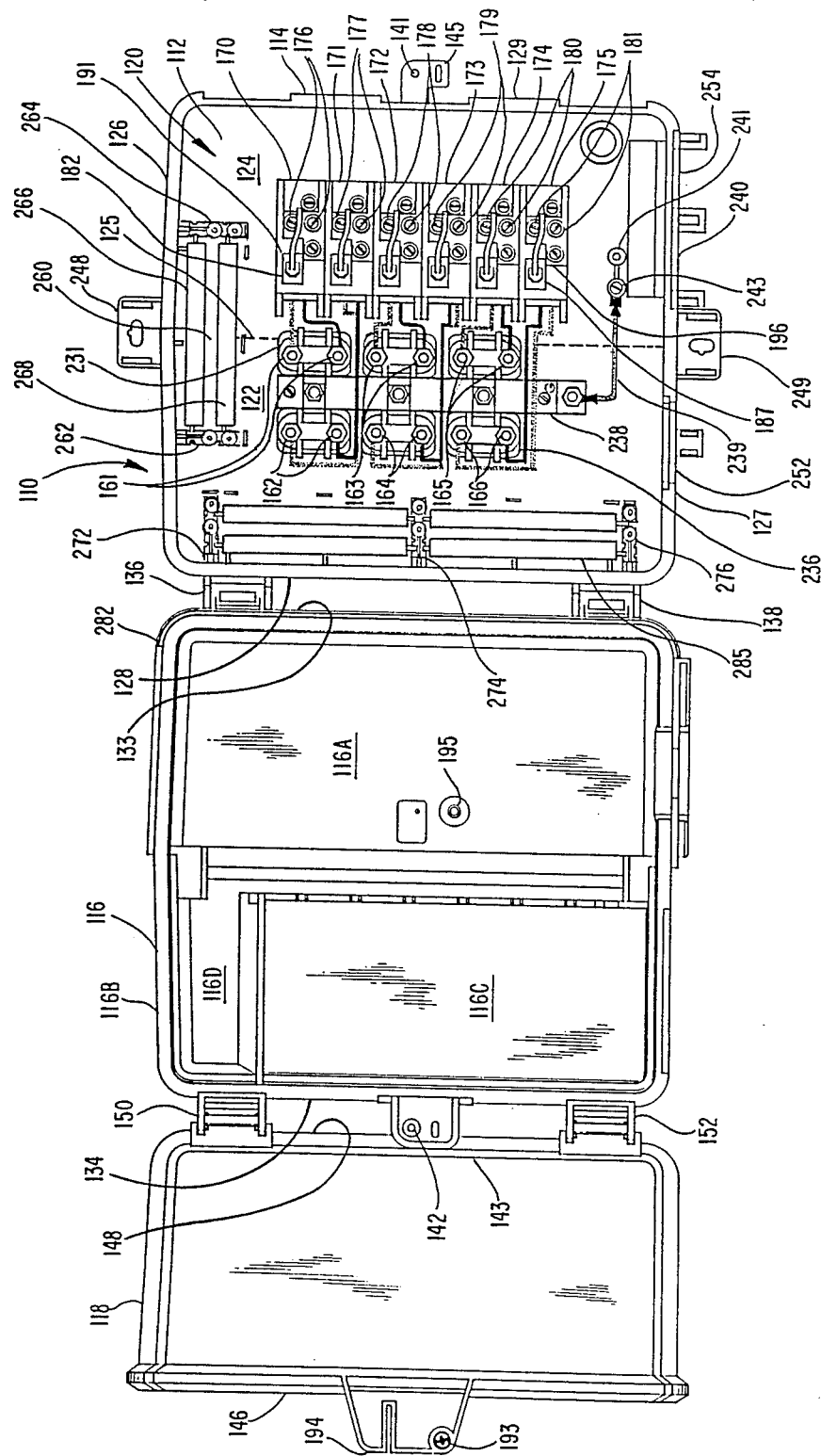
FIG. 18A is a view similar to FIG. 18 but showing the telephone company and subscriber covers in the fully opened positions and showing the telephone company terminals and individual subscriber line modules mounted to the base of the apparatus.

Referring now to FIGS. 11–20, and in particular to FIGS. 11, 18 and 18A, an alternate embodiment of telephone network interface apparatus embodying the present invention is shown and indicated by general numerical designation 110. Apparatus 110 includes a generally rectangular base 112, a continuous generally rectangular wall 114 circumscribing the base and extending outwardly therefrom, a generally rectangular telephone company cover 116 and a generally rectangular subscriber cover 118. The wall 114 includes a top wall 126, a bottom wall 127, a left wall 128 and a right wall 129. The base 112 and wall 114 cooperatively provide an open compartment indicated by general numerical designation 120 including a leftward telephone company compartment portion 122 and a rightward subscriber compartment portion 124, the separation between such compartment portions being indicated generally by the dashed line 125. Generally it will be understood, and as described in detail below and as shown in detail in FIG. 18A, the telephone company compartment portion 122 is for having a plurality of telephone company terminals 161 . . . 166 (FIG. 18A) mounted therein for connection to a plurality of incoming telephone lines (not shown) and the subscriber compartment 124 is for having a plurality of individual subscriber line modules 170 . . . 175 (FIG. 18A) mounted removably therein; the modules 170 . . . 175 including or providing a plurality of subscriber terminals 176 . . . 181 for connection to a plurality of subscriber premises lines(not shown); a plurality of telephone jacks 182 . . . 187 and a plurality of telephone plugs 191 . . . 196 (for clarity of presentation only telephone jacks 182 and 187 and telephone plugs 191 and 196 being given numerical designations in FIG. 18A). It will be noted that the left side wall 128 extends adjacent the leftward telephone company compartment portion 122 and that the right side wall 129 extends adjacent the subscriber compartment portion 124.

The telephone company cover 116, FIGS. 11, 18 and 18A, is generally dimensioned to overlie the entire open compartment 120 and includes a solid leftward portion 116A and a rightward portion 116 B having an opening 116C formed therein and dimensioned generally to overlie and expose the subscriber compartment portion 124 or at least the portion thereof for having the plurality of removable individual subscriber line modules mounted therein noted above. The telephone company cover 116 includes generally a left edge or edge portion 133 and a right edge or edge portion 134. The left edge or edge portion 133 of the telephone company cover 116 is mounted pivotally to the left side wall 128 by hinges 136 and 138 (note particularly FIGS. 18 and 18A) to permit the telephone company cover 116 to be pivoted toward the base 112 to cause the solid leftward portion 116A of the telephone company cover to close the telephone compartment portion 122 and to permit the telephone company cover 116 to be pivoted away from the base 112 to cause the solid leftward portion 116A of the telephone company cover to open the telephone company compartment portion. The right edge or edge portion 134 of the telephone company cover 116 and the right side wall 129 are provided with cooperative threaded fastening means indicated by general designation 140 (FIG. 12) and including a screw 142 (FIG. 19) mounted rotatably in a tab 143 provided on the rightward edge or edge portion 134 of the telephone company cover and a threaded bore or hole 141 formed in a tab 145 provided on the right wall 129; upon the telephone company cover 116 being closed over the base 112, the threaded screw 142 is for being threaded into the threaded bore 141 to threadedly fasten the telephone company cover closed over the base 112 and to the right side wall 114 with the solid leftward portion 116A of the telephone company cover closing the telephone company compartment portion 122 and covering the telephone company terminals 161 . . . 166. The head of the screw 142 is of a type not generally available to the public and is for being fastened and unfastened by a tool also not generally available to the public but which tool may be carried by telephone company personnel to fasten and unfasten the screw 142. Use of the screw head and the special tool generally denies access to the telephone company compartment 122, and hence to the telephone terminals 161 . . . 166, to others than telephone company personnel.

The subscriber cover 118, particularly FIGS. 11, 18 and 18A, is generally rectangular as noted above, is solid and is generally dimensioned to overlie the subscriber compartment portion 124; the subscriber cover 118 includes a leftward edge or edge portion 146 and a rightward edge or edge portion 148. The rightward edge or edge portion 148 of the subscriber cover 118 is mounted pivotally to the right edge or edge portion 134 of the telephone company cover 116 by hinges 150 and 152 to permit the subscriber cover 118, while the telephone company cover 116 is fastened to the right side wall 129 as described above, to be pivoted toward the base 112 to close the subscriber compartment portion 124 and to be pivoted away from the base to open the subscriber compartment portion.

The solid leftward portion 116A of the telephone company cover 116 and the leftward edge or edge portion 146 of the subscriber cover 118 are provided with cooperative threaded fastening means indicated by general numerical designation 190 (FIG. 12) and including a threaded screw 193 (FIG. 11) mounted rotatably in a tab 194 (FIG. 11) provided on the leftward edge or edge portion 146 of the subscriber cover 118 which screw 193 is threadedly received within a threaded bore 195 (FIGS. 11, 18, 18A) provided in the leftward solid portion 116A of the telephone company cover 116. Upon the threaded screw 193 being threaded into the bore 195, the subscriber cover 118 is fastened closed over the subscriber compartment portion 124, and over the telephone company terminals 161 . . . 166 and to the telephone company cover 116. Accordingly, it will be understood that upon the first cooperative threaded fastening means 140 being fastened by telephone company personnel to fasten the telephone company cover 116 to the right side wall 129, and upon the second cooperative fastening means 190 being unfastened by either telephone company personnel or the subscriber the subscriber cover 118 is for being pivoted away from the base 112 to expose the subscriber compartment portion 124 to the exterior to permit access by either telephone company personnel or the subscriber to the above-noted plurality of removable individual subscriber line modules 170 . . . 175 providing the plurality of subscriber terminals 176 . . . 181, telephone jacks 182 . . . 187 and telephone plugs 191 . . . 196. It will be further understood that upon the subscriber cover 118 being threadedly fastened to the telephone company cover 116 and upon the screw 142 being unthreaded from the bore 141 to unfasten the telephone company cover 116 from the right side wall 129, the telephone company cover 116 may be pivoted away from the base 112 to expose both the telephone company compartment portion 122 and the subscriber compartment portion 124 to the exterior to provide telephone company personnel access to both the plurality of telephone terminals 161 . . . 166, the plurality of subscriber terminals 176 . . . 181, telephone jacks 182 . . . 187, and telephone plugs 191 . . . 196.

Figure 20:
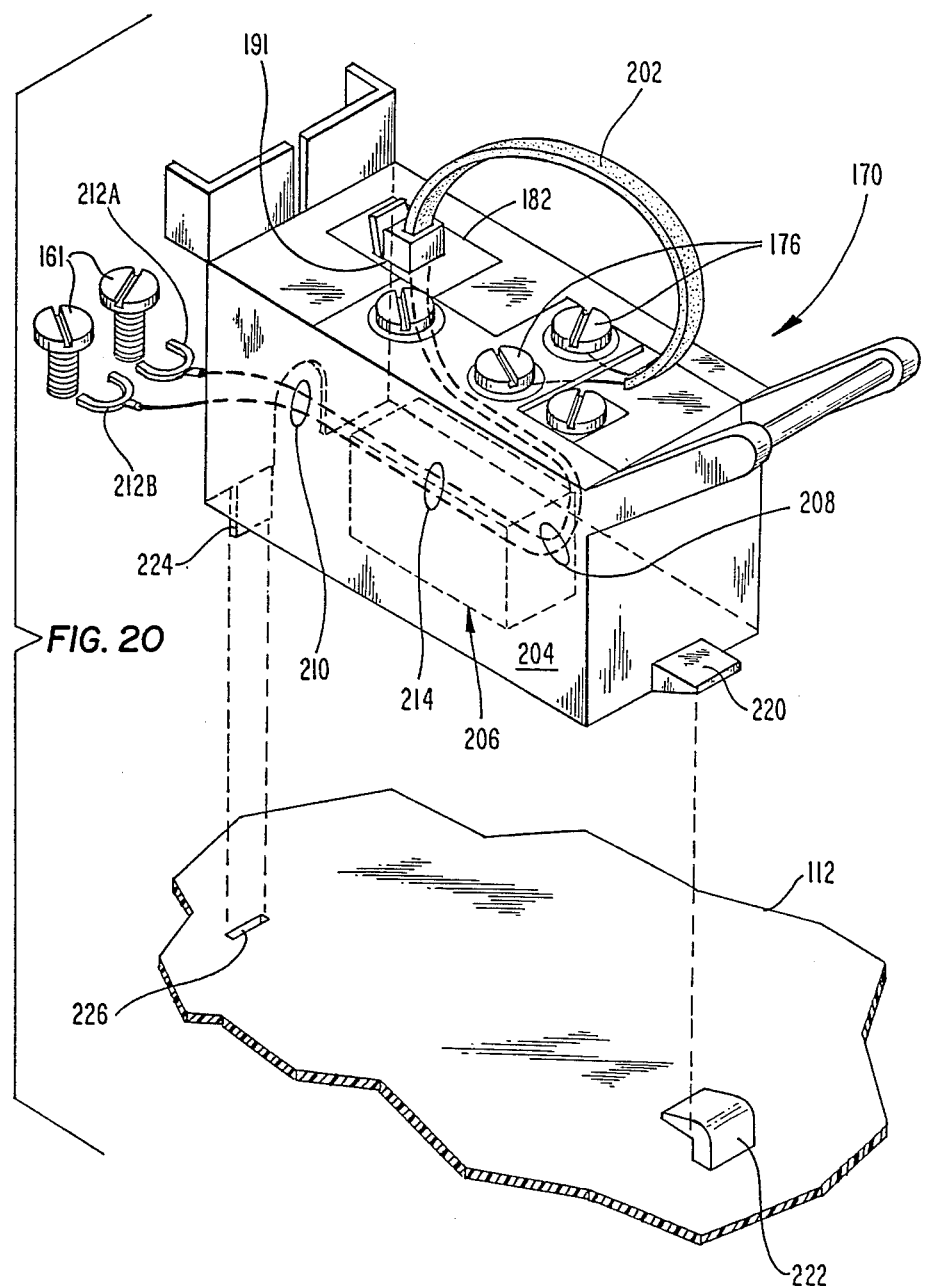
FIG. 20 is a perspective exploded view of an individual subscriber line module a plurality of which may be mounted on the base (partially shown) of the telephone network interface apparatus as illustrated in front elevational view in FIG. 18.

Referring now more particularly to the removable individual subscriber line modules 170 . . . 175, a more complete understanding of the detailed structure of these modules may be obtained by reference to FIG. 20 where the detailed structure of representative module 170 is shown in detail. Generally, it will be understood that the removable individual subscriber line modules, e.g. module 170, may be an embodiment of removable individual subscriber line modulates disclosed U.S. Pat. Application Ser. No. 07/322,361, filed Mar. 13, 1989, entitled INDIVIDUAL SUBSCRIBER LINE MODULE, and assigned to the same assignee as the present invention; Patent Application Ser. No. 07/322,361 is a continuation-in-part patent application of U.S. Pat. Application Ser. No. 07/139,590, filed Dec. 30, 1987, and entitled TELEPHONE NETWORK INTERFACE APPARATUS. As shown in FIG. 20, module 170 has a pair of subscriber line terminals 176 mounted thereon, an associated telephone jack 182 mounted thereon, and includes an associated telephone plug 191 electrically interconnected to the pair of subscriber terminals 176 by dual conductor cable 202 with the electrical conductors thereof being shown in dashed outline in FIG. 20 and shown connected electrically to the pair of subscriber terminals 176. The module 170 is provided with internal space indicated by general numerical designation 204 for receiving or housing a telephone circuit indicated by general numerical designation 206 which telephone circuit may be, for example, a Maintenance Termination Unit, Half-Ringer or the like, with one end of the telephone circuit 206 connected electrically to the telephone jack 182 by electrical conductors 208 and with the other end of the telephone circuit 206 connected electrically to a pair of telephone terminals 161 by electrical conductors 210 provided on their ends with spade terminals 212A and 212B; it will be understood that in the event the telephone circuit 206 is not included, the telephone jack 182 is connected directly to the pair of telephone terminals 161 by the electrical conductors shown by dashed lines in FIG. 20 and identified by numerical designation 214.

Referring now to the removable mounting of the individual subscriber line module 170 to the base 112 of the telephone network interface apparatus 110, the module is provided with an outwardly extending wedge shaped member 220 at its lower rightward end and a downwardly extending member 224 at its lower leftward end; the base 112 is provided with an upwardly extending inverted L-shaped member 222 and a hole 226. To removably mount the module 170 to the base 112, the outwardly extending wedge shaped member 220 is wedged under the upwardly extending inverted L-shaped member 222 and the downwardly extending member 224 is inserted into the hole 226; for removal of the module, the mounting procedure is reversed.

Thus, FIG. 20, it will be understood that upon an incoming telephone line (not shown) being connected to the pair of telephone terminals 161 and upon the subscriber premises line (not shown) being connected to the pair of subscriber terminals 176, and upon the plug 191 being plugged into the jack 182, the subscriber premises line is connected electrically to the incoming telephone line. Upon the telephone plug 191 being unplugged from the telephone jack 182 and upon the plug of an operating telephone being plugged into the telephone jack 182, determination of whether a fault exists on the incoming telephone line or the subscriber premises line is facilitated.

Referring again to FIG. 18A, it will be understood that the plurality of pairs of telephone company terminals 161 . . . 166 are provided respectively on protectors (e.g. lightning arrestors) 231 . . . 236 (only protectors 231 and 236 being given numerical references for clarity of presentation) which protectors are mounted to ground buss 238 by threaded bolts as shown; the ground buss 238 is in turn mounted to the base 112 by screws as shown. The ground buss 238 may be connected to ground, e.g. earth ground, by electrical conductor 239 which in turn may be connected to earth ground by another electrical conductor (not shown) admitted into the compartment 120 through the grommeted opening 240 (FIG. 18A) and connected to terminal 241 connected in turn to terminal 243.

For vertical mounting of the telephone network interface apparatus 110 at the subscriber's premises, the apparatus 110 (FIGS. 11 and 18A) may be provided with respective upwardly and downwardly extending tabs 248 and 249 provided with holes or openings as shown for receiving screws or nails for mounting the apparatus to a suitable vertical support such as a wall (not shown) located at the subscriber's premises.

Figure 13:
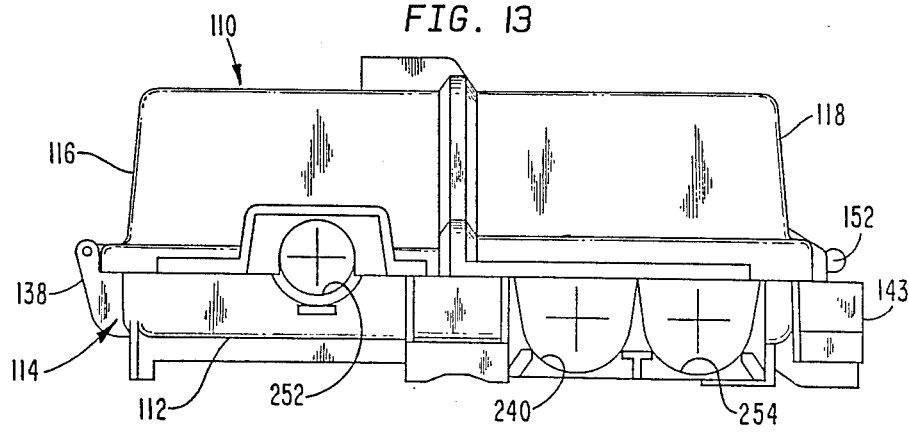
Figure 15:
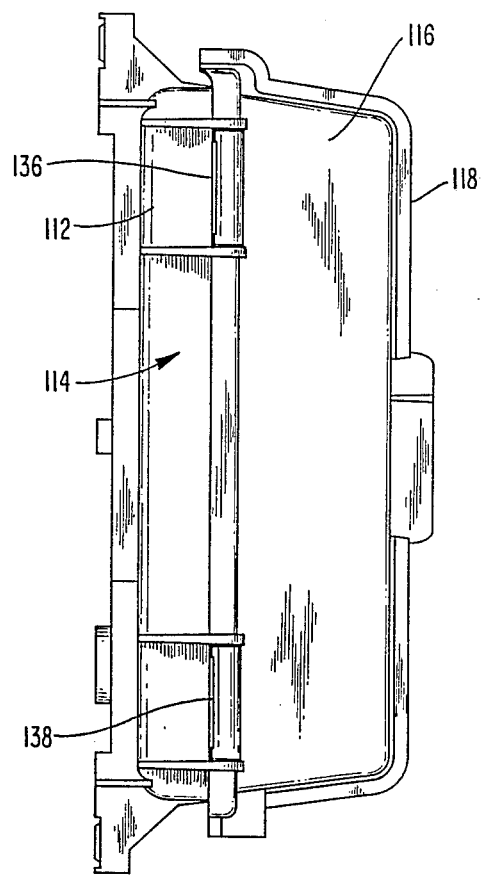
Figure 14:
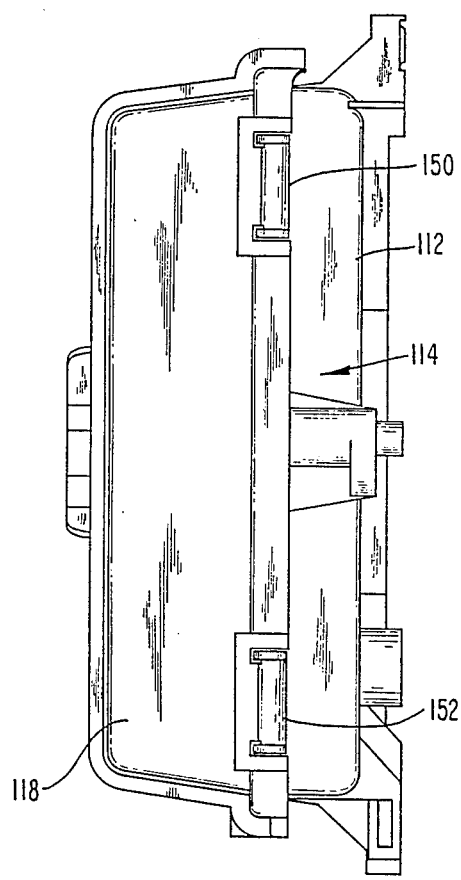
Figure 16:
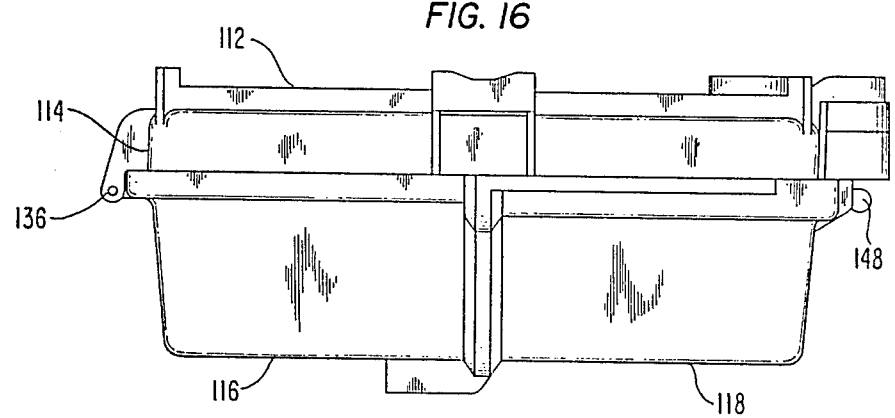
Figure 17:
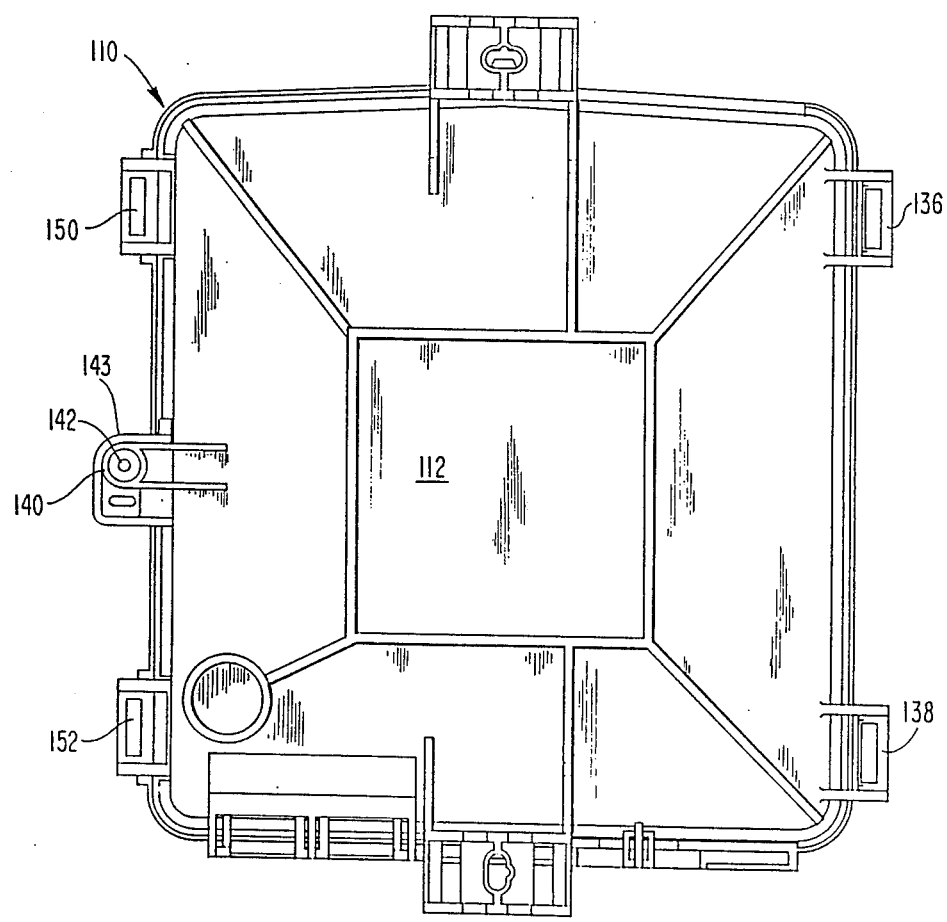
Figure 19:
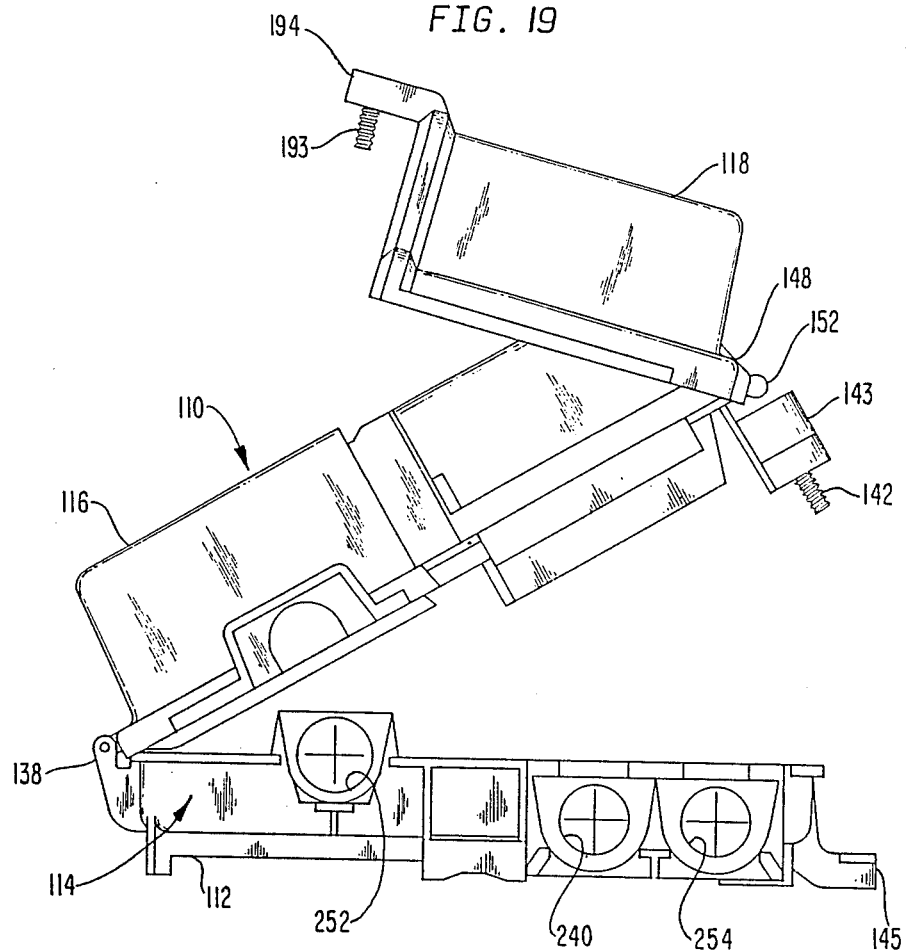
FIG. 19 is a bottom view of the telephone network interface apparatus shown in perspective in FIG. 11.

It will be further understood, and referring to FIGS. 13, 18A and 19, that the incoming telephone company lines (not shown) may be admitted to the telephone company compartment portion 122 through the grommeted opening 252 formed in the leftward portion of the bottom wall 127 and that the subscriber premises lines (not shown) may be admitted into the subscriber compartment portion 124 through the grommeted opening 254 formed in the rightward portion of the bottom wall 127.

As shown in FIG. 18A, the compartment 120 may also include an upper compartment portion common to the telephone company compartment portion 122 and the subscriber compartment portion 124 and indicated by general numerical designation 260. Opposed upwardly extending posts 262 and 264 may be mounted suitably to the base 112 in the common compartment portion 260 and provided with opposed inwardly extending slots as shown for slidably receiving and mounting telephone circuits 266 and 268, such as a Maintenance Termination Unit, Half-Ringer, party line electronics or the like, for connection typically between the protectors 231 . . . 236 and the individual subscriber line modules 170 . . . 175 in the manner known to those skilled in the art. As may be understood particularly from FIGS. 11 and 18A, the telephone company cover 116 may be provided with a solid upper rightward portion 116D which, in cooperation with the upper portion of the solid leftward portion 116A of the telephone company cover 116 closes and covers such telephone circuits 266 and 268 upon the telephone company cover 116 being closed and fastened as described above Similarly, opposed upwardly extending posts 272, 274 and 276 may be suitably mounted to the base 112 in the leftward portion of the telephone company compartment portion 122 and provided with opposed inwardly extending slots as shown for slidably receiving and mounting telephone circuits 282 . . . 285 which may be the same as telephone circuits 266 and 268 and for the same purposes; the solid leftward portion 116A of the telephone company cover 116 is also for being closed and fastened over the telephone circuits 282 . . . 285 upon being fastened as described above.

In brief general summary, it will be noted that in each of the above-described embodiments of the present invention the incoming telephone company lines enter the apparatus in the leftward portion thereof and the subscriber premises lines enter the apparatus in the rightward portion thereof. This is done in the preferred embodiments to accommodate the present typical approach of the regional Bell Operating Companies which desire such respective leftward and rightward entry of the incoming telephone lines and the subscriber premises lines into telephone network interface apparatus. However, it will be understood that the present invention is not so limited and that the reverse is within the contemplation of the present invention.

It will be understood by those skilled in the art that many modifications and variations may be made in the present invention without departing from the spirit and the scope thereof.

What is claimed is:

1. Telephone network interface apparatus, comprising:

a base and a wall circumscribing said base and extending outwardly therefrom said base and wall cooperatively providing an open compartment having a telephone company compartment portion and a subscriber compartment portion;

said telephone company compartment portion for having a plurality of pairs of telephone company terminals mounted therein for connection to a plurality of incoming telephone company lines and said subscriber compartment portion for having a plurality of subscriber terminals mounted therein for connection to a plurality of subscriber premises lines;

a telephone company cover mounted pivotally to a portion of said wall and for being closed and fastened over said telephone company compartment portion;

first fastening means for fastening said telephone company cover closed over said telephone company compartment portion;

a subscriber cover mounted pivotally to said telephone company cover and for being closed and fastened over said subscriber compartment portion; and second fastening means for fastening said subscriber cover closed over said subscriber compartment portion.

2. Telephone network interface apparatus, comprising:

a generally rectangular base and a wall circumscribing said base and extending outwardly therefrom, said wall including top, bottom and a first side wall;

said base and said wall cooperatively providing an open compartment divided generally into adjacent telephone company and subscriber compartment portions;

said telephone company compartment portion for having a plurality of pairs of telephone company terminals mounted therein for connection to a plurality of incoming telephone company lines and said subscribed compartment portion for having a plurality of subscriber terminals mounted therein for connection to a plurality of subscriber premises lines;

said top wall including a first portion extending generally above said telephone company compartment portion; a generally rectangular telephone company cover generally dimensioned to overlie said telephone company compartment portion and including top, bottom and inner edges; said top edge mounted pivotally to said first portion of said top wall to permit said telephone company cover to be pivoted toward said telephone company compartment portion to close the same and to be pivoted away from said telephone company compartment portion to open the same; said bottom wall including a first portion extending generally below said telephone company compartment portion and said first portion of said bottom wall and said bottom edge of said telephone company cover provided with cooperative threaded fastening means for threadedly fastening said telephone company cover closed over said telephone company compartment portion and to said first portion of said bottom wall; and a generally rectangular subscriber cover including inner and outer edges, said inner edge of said subscriber cover mounted pivotally to said inner edge of said telephone company cover to permit said subscriber cover upon said telephone company cover being fastened closed over said telephone company compartment portion to be pivoted toward said subscriber compartment portion to close the same and to be pivoted away from said subscriber compartment portion to open the same; said outer edge of said subscriber cover and said first side wall provided with cooperative snap fastening means for snapping said subscriber cover closed over said subscriber compartment portion, said cooperative snap fastening means upon being unsnapped permitting access to said subscriber compartment portions of both telephone company personnel and subscriber.

3. Telephone network interface apparatus, comprising:

a generally rectangular base and a continuous generally rectangular wall circumscribing said base and extending outwardly therefrom, said continuous wall including top, bottom, left and right walls;

said base and said continuous wall cooperatively providing an open compartment having a leftward telephone company compartment portion and a rightward subscriber compartment portion;

said telephone company compartment portion for having a plurality of pairs of telephone company terminals mounted therein for connection to a plurality of incoming telephone company lines;

said base portion for having a plurality of removable individual subscriber line modules mounted therein for providing a plurality of pairs of subscriber terminals mounted in said subscriber compartment portion for connection to a plurality of subscriber premises lines;

said top wall including a leftward portion extending generally above said telephone company compartment portion;

a generally rectangular telephone company cover generally dimensioned to overlie said telephone company compartment portion and including top, bottom and right edges; said top edge mounted pivotally to said leftward portion of said top wall to permit said telephone company cover to be pivoted toward said telephone company compartment portion to close the same and to be pivoted away from said telephone company compartment portion to open the same;

said bottom wall including a leftward portion extending generally below said telephone company compartment portion and said leftward portion of said bottom wall and said bottom edge of said telephone company cover provided with cooperative threaded fastening means for threadedly fastening said telephone company cover closed over said telephone company compartment portion and to said leftward portion of said bottom wall; and a generally rectangular subscriber cover generally dimensioned to overlie said subscriber compartment portion and including left and right edges, said left edge mounted pivotally to said right edge of said telephone company cover to permit said subscriber cover upon said telephone company cover being fastened closed over said telephone company compartment portion to be pivoted toward said subscriber compartment portion to close the same and to be pivoted away from said subscriber compartment portion to open the same; said right edge of said subscriber cover and said right wall provided with cooperative snap fastening means for snapping said subscriber cover closed over said subscriber compartment portion and said cooperative snap fastening means permitting telephone company personnel to open both of said compartments by threadedly unfastening said cooperative threaded fastening means, and by unsnapping said cooperative snap fastening means and by pivoting said telephone company cover away from said telephone company compartment portion.

4. Telephone network interface apparatus, comprising:

a generally rectangular base and a continuous generally rectangular wall circumscribing said base and extending outwardly therefrom, said continuous wall including first and second side walls;

said base and said continuous wall cooperatively providing an open compartment divided generally into telephone company and subscriber compartment portions;

said telephone company compartment portion for having a plurality of pairs of telephone company terminals mounted therein for connection to a plurality of incoming telephone company lines and said subscriber compartment portion for having a plurality of subscriber terminals mounted therein for connection to a plurality of subscriber premises lines;

said first side wall adjacent said telephone compartment portion;

a generally rectangular telephone company cover generally dimensioned to overlie said entire open compartment and including first and second cover portions, said first cover portion being solid and dimensioned to generally overlie and close said telephone company compartment portion and said second cover portion provided with an opening for generally overlying and exposing said subscriber compartment portion, said telephone company cover including generally first and second side edge portions and said first side edge portion of said telephone company cover being mounted pivotally to said first side wall and said second side edge portion of said telephone company cover and said second side wall provided with first cooperative threaded fastening means for threadedly fastening said telephone company cover closed over said open compartment and to said second side wall with said solid first portion of said telephone company cover closing said telephone company compartment portion; and a generally rectangular subscriber cover generally dimensioned to overlie said subscriber compartment portion and including generally first and second side edges, said second side edge of said subscriber cover mounted pivotally to said second side edge of said telephone company cover to permit said subscriber cover while said telephone company cover is fastened to said second side wall to be pivoted toward said base to close said subscriber compartment portion and to be pivoted away from said base to open said subscriber compartment portion, said solid portion of said telephone company cover including a first cover edge portion and said first side edge of said subscriber cover and said first cover portion provided with second cooperative threaded fastening means for threadedly fastening said subscriber cover closed over said subscriber compartment portion and to said telephone company cover.

5. Telephone network interface apparatus, comprising:

a generally rectangular base and a continuous generally rectangular wall circumscribing said base and extending outwardly therefrom, said continuous wall including top, bottom, left and right walls;

said base and said continuous wall cooperatively providing an open compartment having a leftward telephone company compartment portion and a rightward subscriber compartment portion; said leftward telephone company compartment portion for having a plurality of pairs of telephone company terminals mounted therein for connection to a plurality of incoming telephone company lines and said rightward subscriber compartment portion for having a plurality of removable individual subscriber line modules mounted therein for providing a plurality of pairs of subscriber terminals for connection to a plurality of subscriber premises lines;

said left side wall extending adjacent said leftward telephone company compartment portion;

a generally rectangular telephone company cover generally dimensioned to overlie said entire open compartment and including a solid leftward portion generally dimensioned to overlie and cover said telephone company compartment portion and a rightward portion having an opening formed therein generally dimensioned to overlie and expose said subscriber compartment portion for having said plurality of individual subscriber line modules mounted therein, said telephone company cover including generally left and right edge portions, said left edge portion of said telephone company cover mounted pivotally to said left side wall to permit said telephone company cover to be pivoted toward said base to cause said solid leftward portion of said telephone company cover to close said telephone company compartment portion and to permit said telephone company cover to be pivoted away from said base to cause said solid leftward portion of said telephone company cover to open said telephone company compartment, and said right edge portion of said telephone company cover and said right side wall provided with first cooperative threaded fastening means for threadedly fastening said telephone company cover closed over said base and to said right side wall with said solid leftward portion of said telephone company cover closing said telephone company compartment portion;

a generally rectangular subscriber cover generally dimensioned to overlie said subscriber compartment portion and including generally leftward and rightward edge portions, said rightward edge portion of said subscriber cover for being mounted pivotally to said rightward edge portion of said telephone company cover to permit said subscriber cover while said telephone company cover is fastened to said right side wall to be pivoted toward said base to close said subscriber compartment portion and to be pivoted away from said base to open said subscriber compartment portion, said solid leftward portion of said telephone company cover and said leftward edge portion of said subscriber cover provided with second cooperative threaded fastening means for threadedly fastening said subscriber cover closed over said subscriber compartment portion and to said telephone company cover; and upon said first cooperative fastening means being fastened and upon said second cooperative means being unfastened, said subscriber cover for being pivoted away form said base to expose said subscriber compartment portion to the exterior to permit access to said plurality of subscriber terminals by telephone company personnel and subscriber, and upon said second cooperative fastening means being fastened and upon said first cooperative fastening means being unfastened said telephone company cover for being pivoted away from said base to expose said telephone company and said subscriber compartment portions to the exterior to provide access to said plurality of telephone company terminals and said plurality of subscriber terminals to telephone company personnel.

6. Telephone network interface apparatus according to any one of claims 1, 2 or 4 wherein said apparatus include said plurality of telephone company terminals and said plurality of subscriber terminals and wherein said apparatus further includes a plurality of telephone plugs and telephone jacks and first connecting means for electrically connecting said plurality of telephone jacks to said plurality of telephone company terminals and second connecting means for electrically connecting said telephone plugs to said plurality of subscriber terminals, said telephone plugs for being plugged into said telephone jacks to interconnect said incoming telephone company lines with said subscriber premises lines and said telephone plugs for being unplugged from said jacks to permit an operating telephone to be plugged into said jacks to facilitate determination of whether faults exist on said incoming telephone company lines or said subscriber premises lines.

7. Telephone network interface apparatus according to claim 3 or 5 wherein said apparatus includes said plurality of removable individual subscriber line modules and wherein said base and said modules are provided with cooperative mounting means for mounting said modules removably to said base, wherein each of said modules is provided with one of said pair of subscriber terminals, a telephone jack and a telephone plug connected to said one pair of subscriber terminals, wherein said apparatus includes electrical connecting means for electrically connecting said telephone jack to one of said pair of telephone terminals, said telephone plug for being plugged into said telephone jack to interconnect one of said incoming telephone company lines with one of said subscriber premises lines and said telephone plug for being unplugged from said telephone jack to permit the plug of an operating telephone to be plugged into said telephone jack to facilitate determination of whether a fault exists on said one incoming telephone company line or said one subscriber premises line.

8. Telephone network interface apparatus according to claim 5 wherein said open compartment has an upper compartment portion generally common to said telephone company and said subscriber compartment portions, said upper compartment portion provided with mounting means for mounting at least one telephone circuit therein, and wherein said telephone company cover further includes an upper solid portion for being closed and fastened over said upper compartment portion.

9. Telephone network interface apparatus according to claim 8 wherein said telephone compartment portion includes a leftward portion provided with second mounting means for mounting at least one telephone circuit therein, and wherein said solid leftward portion of said telephone company cover is also for being closed and fastened over said leftward portion of said telephone compartment portion.

* * * * *